United States Patent Office 2,880,165
Patented Mar. 31, 1959

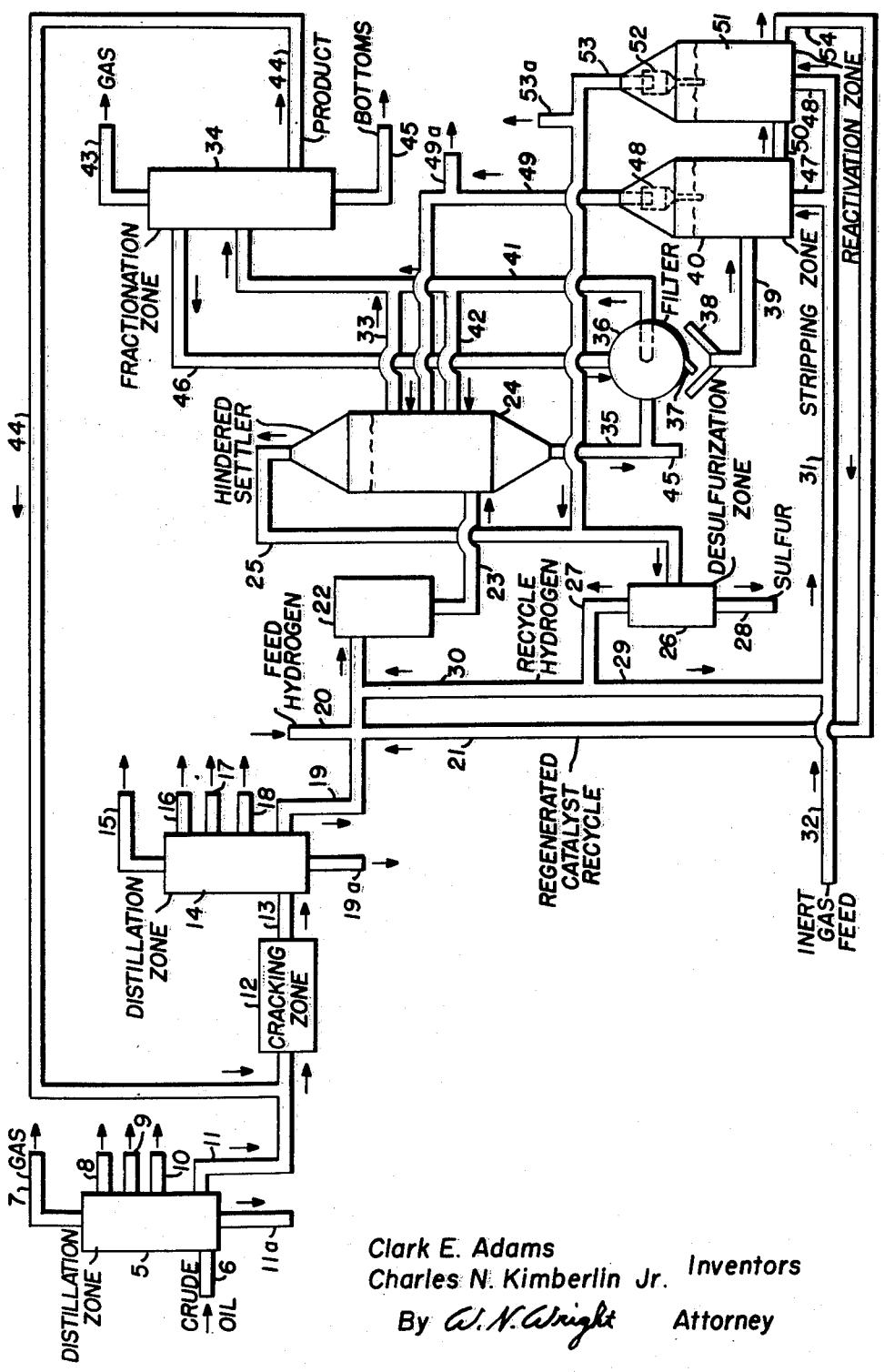

2,880,165

PROCESS FOR THE DESULFURIZATION AND HYDROGENATION OF A CYCLE OIL

Clark E. Adams and Charles N. Kimberlin, Jr., Baton Rouge, La., assignors to Esso Research and Engineering Company, a corporation of Delaware Application June 9, 1954, Serial No. 435,559

9 Claims. (Cl. 208—97)

The present invention concerns the hydrogenation and desulfurization of sulfur containing hydrocarbons, particularly aromatic hydrocarbons. It especially relates to the hydrogenation and desulfurization of mineral oil fractions that boil above about 450° F. It has particular application to the treatment of cycle oils that are derived from the cracking of petroleum stocks and especially from the catalytic cracking of such stocks.

The hydrogenation of mineral oils is of great interest in the petroleum industry for the improvement of the quality of lubricants, diesel fuels, heating oils and the like. Hydrogenation is also useful for the improvement of feed stocks for other conversion processes such as catalytic cracking. A particular application of hydrogenation is to improve the quality of catalytic cracking cycle stock for further cracking. Catalytic cracking cycle stock is the higher boiling product, boiling above about 450° F., from the catalytic cracking of gas oils. This material contains highly aromatic hydrocarbons which are deficient in hydrogen and upon recracking produce excessive amounts of coke and gas.

Since these petroleum fractions normally contain sulfur compounds which are extremely difficult to remove, it has heretofore been necessary to employ sulfur-insensitive catalysts such as molybdenum sulfide, tungsten sulfide or the like for their hydrogenation. Unfortunately insensitive catalysts are all of low activity and require high hydrogen pressures above about 600 pounds per square inch in order to achieve reasonably high rates of hydrogenation.

Heretofore it has been impractical to use the more active sulfur-sensitive hydrogenation catalysts such as platinum, which are effective at lower pressures of 300 pounds per square inch or lower, because these sensitive catalysts soon lost activity through sulfur poisoning and no adequate means of regeneration was available.

Platinum-type catalysts of the type contemplated by the present invention are well known in the art. Generally speaking, these catalysts consist of conventional catalyst supports such as particulate alumina, silica gel, char, alumina-silica, silica-magnesia, etc., that are impregnated with from about 0.2 to 2.0 wt. percent platinum. They have found particular application as for example as reforming catalysts.

The processing and utilization of aromatic oils present serious problems to the refiner. In general, such stocks cannot be economically subjected to cracking operations, since they produce excessive amounts of carbon and light gas upon being so treated. Furthermore, they contain relatively large amounts of sulfur in the order of about 0.5 to 3 wt. percent, and the sulfur in itself creates additional problems. The sulfur not only serves to poison or impair the activity of catalysts that are employed in various refining operations, but it also is extremely corrosive toward refinery equipment.

An aromatic stock which is outstanding because of the problems that it poses for petroleum refiners is cycle oil derived from cracking operations and particularly from catalytic operations. Cycle oil by definition comprises the products that are formed by cracking a petroleum fraction and that boil above about 450° F. and usually in the range of about 450° F. to 900° F. In some instances material boiling as low as about 415° F. may be included in a cycle oil. Cycle oils generally have gravities in the range of about 15° to 25° API and usually contain about 20 to 50 volume percent of aromatic constituents. These constituents may be alkylated monocyclic aromatics, or they may be polycyclic aromatics.

A number of suggestions have been made concerning the utilization of aromatic cycle oils from catalytic cracking. For example, it has been suggested that such oils be merely recycled to the cracking reaction and cracked to the point of extinction. As mentioned earlier, however, cycle oils when cracked form excessive yields of coke and light gas. Furthermore, the products produced thereby generally contain undesirable amounts of sulfur.

It has also been proposed that aromatic cycle oils be hydrogenated at conventional hydrogenation temperatures and pressures with sulfur tolerant catalysts and the hydrogenation products then returned to the cracking reaction. While the products formed by such a technique constitute a much more desirable feed than cycle oil for a catalytic cracking reaction, this proposal is not entirely satisfactory. In the first place, at conventional hydrogenation temperatures with sulfur tolerant catalysts, extremely high hydrogen pressures are required to hydrogenate such stocks in order to prevent their degradation into carbon and light gas. Hydrogen pressures, for example, of the order of 600 to 5,000 p.s.i.g., are required at conventional hydrogenation temperatures of about 550° to 800° F. when hydrogenating cycle oil or stocks that are similar to cycle oil.

The high hydrogen pressures in turn necessitates the use of very expensive reaction vessels, compressors and the like. For these reasons hydrogenation has not been generally applied to the upgrading of cycle oils in the past.

Accordingly, it is a primary object of the present invention to provide a method for the hydrogenation and desulfurization of high boiling, highly aromatic petroleum hydrocarbons which contain substantial amounts of sulfur. It is a particular object of the invention to provide a method for hydrogenating and desulfurizing aromatic cycle oils whereby these oils are made more attractive for catalytic cracking. It is a further object of the invention to provide a process of this type which may be carried out at relatively low hydrogenation pressure. Temperatures of the order of 300° to 700° F., and pressures of about 300 p.s.i.g. or less are particularly contemplated.

These objectives may be achieved in accordance with the present invention by contacting an aromatic stock, and a cycle oil in particular, with a very active hydrogenation catalyst—namely, a platinum-type catalyst. The aromatic stock is hydrogenated in the presence of the catalyst in the liquid phase at pressures below about 300 p.s.i.g. and at moderate temperatures of about 300° to 700° F. Under these conditions the aromatic constituents of the hydrocarbon stock are at least partially hydrogenated, and the sulfur content of the stock is at least partially reduced by combination with the platinum in the hydrogenation catalyst. It is preferred that the stock be hydrogenated to the extent of increasing the gravity by at least about 2° API. Gravity increases as great as about 10° API may be obtained.

It is further preferred that the sulfur content be reduced to about 0.1% and less.

In further accordance with the present invention the ratio of platinum to sulfur in the hydrogenation zone must be maintained a a value of at least one atom of platinum per two atoms of sulfur. The upper limit for this ratio is not critical but practical limitations would call for an upper limiting ratio of about 10 atoms of platinum per atom of sulfur.

The slurry of hydrogenated product and spent catalyst and hydrogen is conveyed from the hydrogenation zone to a separation zone where hydrogen is released overhead and the catalyst and liquid product separated. The separation zone includes preferably a settler where the liquid collects at the top of the zone and the catalyst at the bottom. The settled spent catalyst is separated from residual liquid hydrocarbon product as by filtering or other suitable means and is then sent to a stripping zone. In the stripping zone the spent catalyst is contacted with hydrogen or an inert gas such as nitrogen at temperature and pressure conditions adapted to remove sulfur and sulfur compounds from the catalyst. It is particularly contemplated that temperatures in the range of about 500° to 900° F. and pressures up to about 300 p.s.i.g. be employed. The catalyst is then reactivated by heating at 600° F. to 1300° F., preferably about 900° to 1100° F., in hydrogen. The regenerated catalyst is then returned to the hydrogenation step. The liquid product from the settling zone may be fractionated into as many products as desired. It is particularly contemplated that a product boiling in the range of about 450° to 900° F. be employed as a feed for a catalytic cracking operation.

The invention may be better understood from the following description of one adaptation that is contemplated to be the best mode for carrying out a preferred embodiment of the same. Reference is also made to the attached figure which is intended to accompany the written description. The description is concerned with the processing of a petroleum crude oil which may be any one of the conventional crude oils that are processed by petroleum refiners.

The crude oil flows through line 6 into distillation zone 5 which may be a single fractionation zone or a combination of an atmospheric and sub-atmospheric fractionation zones. In any event the crude oil is fractionated within zone 5 into a plurality of fractions including a non-condensing gas in line 7, a light naphtha fraction in line 8, a heavy naphtha fraction in line 9, a kerosene fraction in line 10 and a fraction boiling above about 450° F. in line 11. A residual fraction is also withdrawn by line 11a. Other fractions such as a heating oil fraction, a light gas oil fraction and the like may also be withdrawn from zone 5 if so desired. The fraction of immediate concern to the present invention is the fraction in line 11 which flows to cracking zone 12.

Cracking zone 12 may constitute anyone of the catalytic or thermal cracking processes that are conventionally employed in the petroleum industry for cracking petroleum fractions. Thus, cracking zone 12 may utilize either a thermal process or a catalytic process. When employing a catalytic process this zone may utilize a fixed bed, a fluidized bed, a moving bed or a suspensoid form of catalyst; and the catalyst may be a natural catalyst such as montmorillonite or a synthetic catalyst such as the alumina-silica type or the magnesia-silica type. Furthermore, cracking zone 12 may to operated at cracking temperatures within the range of about 850° to 1000° F. and at pressures of atmospheric to about 25 p.s.i.g. for a catalytic cracking process or pressures up to about 1000 p.s.i.g. for a thermal cracking process. Feed rates for catalytic cracking may be in the range of about 1 to 10 w./hr./w. (weight of feed/hour/weight of catalyst). The heat required for the cracking reaction may be supplied as preheat to the feed stream and/or by utilization of the heat released by the regeneration of the spent catalyst. It will be noted that this particular phase of the process is not a critical part per se of the present invention and persons skilled in the art are already completely aware of the operating conditions, feed rates and so forth that are required for carrying out this particular step. A detailed description of this phase of the process will not, therefore, be given at the present time; but it will be appreciated that this phase of the process is materially benefited when combined with the novel features of the present invention. It will be noted that a portion of the hydrocarbon feed to cracking zone 12 is derived from fractionation zone 34 via line 44. The derivation and significance of this portion of the cracking feed stock will be brought out more fully later in this description.

The cracked products from cracking zone 12 flow through line 13 into a second fractionation zone 14 where they are fractionated into a plurality of fractions including an overhead fraction in line 15, a light cracked naphtha in line 16, a heavy cracked naphtha in line 17, a cracked kerosene fraction in line 18, and a fraction boiling above about 450° F. in line 19. A bottoms fraction boiling above about 900° F. may also be withdrawn by line 19a. It will be noted, of course, that other fractions in addition to those enumerated may also be withdrawn from zone 14.

The fraction in line 19 which hereafter will be referred to as a cycle oil is combined with a finely-divided, platinum-type hydrogenation catalyst from line 21, feed or make-up hydrogen from line 20 and recycle hydrogen from line 30. The combined stream in line 19 flows through a heating zone such as a furnace 22 where it is heated to a temperature within the range of about 300° to 700° F. and a pressure within the range of about atmospheric to 300 p.s.i.g. The mixture then flows into a hindered settling zone 24.

The combined stream that enters heating zone 22 and hindered settler 24 is comprised of hydrogen and a slurry of cycle oil and hydrogenation catalyst. It is particularly contemplated, as stated earlier, that the hydrogenation catalyst be of a platinum-type which is well known in the art. The relative amount of each constituent to be employed may be ascertained as follows. For a given amount of cycle oil containing a given amount of sulfur, it is desired to employ an amount of catalyst sufficient to provide the stream entering zone 22 with at least one atom of platinum for every two atoms of sulfur. Amounts of platinum in excess of this ratio may be employed without any adverse effect on the process, but it is generally desired to limit the atomic ratio of platinum to sulfur to values below about 20:1 and especially about 10:1. The amount of hydrogen to be employed should be in the range of about 200 to 2000, preferably about 500 to 1000, cubic feet per barrel of cycle oil. As stated earlier, a portion of the hydrogen entering zone 22 and zone 24 is hydrogen that is recycled to the process while another portion is make-up hydrogen introduced by means of line 20. The amount of make-up hydrogen is governed by the amount required to provide the operating conditions described above.

The mixture in line 23, which is always maintained under temperature and pressure conditions adapted to retain the cycle oil as a liquid, is introduced within zone 24 in the form of a slurry. Zone 24 is of a character to provide a hindered settling type of action adapted to separate the hydrogenation catalyst particles within the zone from the hydrogenated cycle oil. In other words, zone 24 is of a construction such that the catalyst particles settle to the bottom of the zone while the liquid and gas particles rise to the top of the zone. It will be appreciated that the liquid flow rates within zone 24 must be maintained within a range of values that are provided to permit settling of the particles of catalyst. These flow rates in turn must be related to the particle size and density of the catalyst. For the best operation of zone 24 it is contemplated that the catalysts have a range of particle sizes of about 10 to 200 microns and more particularly about 50 to 150 microns. It is further contemplated that the catalysts have a true density or skeletal density of about 1.5 to 5 and particularly about 2.2 to 3.5. Under these conditions it is contemplated to employ upward liquid flow rates within zone 24 of between 0.01 and 1 foot per minute and particularly between 0.1 to 0.5 foot per minute.

Two reactions occur substantially simultaneously within zone 22 and zone 24. One of these reactions is a hydrogenation process in which aromatic constituents of the cycle oil are hydrogenated at least partially. The other reaction is a desulfurization process in which the sulfur within the cycle oil combines with the platinum of the catalyst. The first of these reactions is believed to be a simple hydrogenation reaction in which hydrogen is added to the hydrogen-deficient molecules. In the second reaction the sulfur compounds contained in the cycle oil feed are decomposed and the sulfur is combined with the platinum catalyst. This second reaction is also thought to involve hydrogenation, probably with the formation of hydrogen sulfide intermediate which then reacts with the platinum of the catalyst. However, our invention is not limited by any theory or mechanism of reaction. Insofar as the first reaction is concerned, it is desired that a cycle oil be hydrogenated to an extent sufficient to increase the gravity by about 2° to 10° API. It is further desired that the sulfur within the cycle oil be reduced to about 0.1 wt. percent or less.

It is apparent that the reaction conditions within zone 22 and zone 24 must be maintained at values sufficient to provide the two reactions just described. When employing the temperature and pressure conditions defined above, it will be necessary, it is contemplated, to utilize reaction times of about 10 minutes to 1 hour and especially about 15 to 30 minutes. A reaction time of about 30 minutes is contemplated to be sufficient for most processing instances.

The hydrogen released from the slurry within settling zone 24 exits through line 25 to a desulfurization zone 26. The hydrogenated and desulfurized cycle oil exits through line 33 and into fractionation zone 34 via line 41. The settled spent catalyst is withdrawn through line 35 and moves to a suitable means for separating it from any residual cycle oil. As illustrated in the figure, one mode contemplated for accomplishing this objective is to employ a rotary filter 36. The separated catalyst on rotary filter 36 is freed of adhering hydrogenated cycle oil by washing with a light wash oil or naphtha from line 46. The wash naphtha in line 46 may be a petroleum fraction boiling in the range of about 200° to 450° F., preferably about 250° to 400° F. The filtration is preferably carried out under substantially the same conditions of pressure and temperature as prevail in zone 22. The filtrate in the form of additional hydrogenated cycle oil containing wash naphtha flows from filter 36 through line 41 directly to fractionation zone 34 along with the cycle oil obtained from settling zone 24. At least a portion of the filtrate which contains the light wash oil may be returned via line 42 to settling zone 24 for the purpose of reducing the viscosity of the hydrogenated cycle oil in zone 24 and thereby promoting better settling in zone 24.

The spent catalyst which is separated from the cycle oil by means of rotary filter 36 is removed from the filter as by means of a scraper 37 and deposited upon a suitable receptacle 38. From here it is transported as by means of a mechanical screw feeder through line 39 into a stripping zone 40.

Returning for the moment to fractionation zone 34, the cycle oil entering this zone is fractionated therein to form a plurality of fractions including an overhead fraction in the form of light vapors and gases in line 43, the main body of hydrogenated product in line 44 and a bottoms fraction in line 45. The bottoms fraction in line 45, which contains a small amount of suspended catalyst, is passed by lines 45 and 35 to filter 36 for catalyst recovery. It will be noted that line 45 is illustrated in two sections in the figure. It is preferred that fractionation zone 34 be operated to provide a product in line 44 that boils above about 450° F. and particularly in the range of about 450° to 900° F.

As further illustrated in the attached figure, the light wash oil or wash naphtha fraction boiling, for example, in the range of about 250° to 400° F. is recovered by line 46 and may be employed substantially between filter 36 and fractionation zone 34 to serve as a wash solution for removing cycle oil from the catalyst which is deposited upon the filter. Thus, this wash liquid may be continuously supplied to the filter 36 by means of line 46. Having passed through the filter, the wash liquid then passes through line 41 into fractionation zone 34 and thence back to filter 36 by means of line 46.

The product cycle oil in line 44 may be catalytically cracked in a separate cracking zone, but it is preferably recycled via feed line 11 to cracking zone 12. As explained earlier, the hydrogenated product is a much more desirable feed stock for a cracking reaction than is cycle oil obtained directly from a cracking reaction. The yield of desirable products is very materially increased. For example, a wide cut gas oil of 30.3° API gravity obtained by distillation of a paraffin base crude is cracked in a once through operation over synthetic silica alumina cracking catalyst at a conversion of about 55%, yielding a cycle stock having an initial boiling point of about 415° F., a final boiling point of about 898° F., and an API gravity of about 21.6°, and a sulfur content of about 0.64 wt. percent. This cycle stock upon re-cracking over an equilibrium used synthetic silica-alumina cracking catalyst at a temperature of 950° F., requires a feed rate of about 0.49 v./v./hr. (volumes of liquid feed per volume of catalyst per hour) for a conversion of about 45% and yields about 24.3 volume percent of $C_5$–430° F. gasoline fraction having a sulfur content of about 0.06 wt. percent, about 10.2 vol. percent $C_4$, about 8.2 wt. percent dry gas, and about 11.2 wt. percent of coke deposits. A portion of the cycle oil is hydrogenated as herein described to yield a hydrogenated cycle oil having an API gravity of about 23.9° and a sulfur content of about 0.1 wt. percent. The hydrogenated cycle oil upon cracking over an equilibrium used synthetic silica-alumina cracking catalyst at a temperature of 950° F., requires a feed rate of only about 0.76 v./v./hr. for a conversion of 45% yielding about 28.4 vol. percent $C_5$–430° F. gasoline fraction having a sulfur content of about 0.01 wt. percent about 12.0 vol. percent $C_4$, about 8.4 wt. percent dry gas and about 4.6 wt. percent of coke deposits.

The spent, sulfur-containing hydrogenation catalyst upon entering stripping zone 40 is subjected to a temperature in the range of about 500° to 900° F. and a pressure in the range of about atmospheric to 300 p.s.i.g. Preferably the pressure in zone 40 is about the same as the pressure in zone 24. Simultaneously, the catalyst is maintained in a fluidized state by means of hydrogen entering via lines 29, 31 and 47. The upward velocity of gas in stripping zone 40 may be in the range of about 0.2 to 3 feet per second, preferably about 0.4 to 1 foot per second. The residence time of catalyst in zone 40 may be in the range of 5 to 30 minutes, preferably about 10 minutes.

The hydrogen gas entering zone 40 strips any remaining cycle oil and/or wash liquid from the spent catalyst and leaves this zone by means of line 49. A suitable separator, as for example cyclone separator 48, is positioned intermediate the exit of stripping zone 40 and the entrance to line 49 for the purpose of separating spent catalyst particles from the exiting gases. The gases and vapors in line 49 enter zone 24 preferably at a point intermediate the slurry entry line 23, and the gas exit line 25. If desired, in place of using hydrogen as a stripping gas in zone 40, an inert gas such as nitrogen entering via lines 32, 31, and 47 may be employed for stripping. However, when stripping with an inert gas it is undesirable to introduce this gas into zone 24 because of the dilution of the hydrogen therein. In such case it is preferred to remove the stripping gas from the system by line 49a.

The stripped catalyst in zone 40 is conveyed by means of line 50 into reactivation zone 51. The actual transfer may be accomplished by means of suitable mechanical devices such as screw feeders, star feeders and the like or by means of the fluidized solids technique. This feature in itself would be obvious to one skilled in the art; and it is not considered necessary, therefore, to present a detailed description of this phase of the process here.

Upon entering zone 51 the stripped catalyst is subjected to temperatures that are greater than the temperatures in zone 40, for example, about 600° to 1300° F. It is particularly preferred that the catalyst in zone 51 be reactivated at a temperature of about 900 to 1100° F. and a pressure of about atmospheric to 300 p.s.i.g. The pressure in zone 51 is preferably about the same as the pressure in zone 24.

The catalyst in reactivation zone 51 is reactivated and fluidized by passing a stream of hydrogen and/or an inert gas such as nitrogen which enters the zone via lines 29, 31 and 48 or lines 32, 31 and 48, respectively.

The upward rate of flow of gas in reactivation zone 51 may be in the range of about 0.2 to 3 feet per second, preferably about 0.4 to 1 foot per second. The residence time of catalyst in zone 51 may be in the range of about 20 minutes to 5 hours, preferably about 1 to 3 hours.

The reactivated catalyst flows from zone 51 through lines 54 and 21 to line 19 where it again mixes with hydrogen and cycle oil before entering heating zone 22 and settling zone 24. It will be noted that the regenerated catalyst must contain less than about one atom of sulfur per 10 atoms of platinum and preferably less than one atom of sulfur per 100 atoms of platinum.

The gases in the form of hydrogen and/or inert gases, sulfur compounds and the like leave zone 51 to cyclone separator 52 and line 53. If an inert gas has been employed in reactivation zone 51, this is vented from the system by line 53a. If hydrogen has been used in reactivation zone 51, the gas in line 53 then mixes with the gases that exit from settling zone 24 through line 25 and the mixture passes into desulfurization zone 26. This zone may comprise any one of a number of processes and equipment that are conventionally employed for scrubbing sulfur from gas streams, such as scrubbing with an alkaline medium or adsorption of the sulfur on an adsorptive material such as activated carbon.

A preferred process for removing sulfur and sulfur compounds from the gas stream entering zone 26 is the well-known process which employs triethanol amine for removing hydrogen sulfide from a gas stream. Once again, the details for carrying out such a process are well known in the art and will not be discussed at length in the present description.

The desulfurized hydrogen is recycled to heating zone 22 and reactivation zone 51 and stripping zone 40 by means of lines 30 and 29, respectively.

What is claimed is:

1. A method for hydrogenating and desulfurizing a cycle oil from the cracking of petroleum stocks, said cycle oil boiling above 415° F. and containing highly aromatic hydrocarbons and from 0.5 to 3.0 wt. percent sulfur which comprises contacting the cycle oil in the form of a slurry for about 10 to 60 minutes with a particulate, platinum catalyst in a reaction zone, introducing said cycle oil and said catalyst within said reaction zone at rates adapted to provide at least 1 atom of platinum for every 2 atoms of sulfur, introducing hydrogen within said reaction zone at a rate of between 500 and 1000 s.c.f. per barrel of cycle oil, maintaining the pressure and temperature within said reaction zone to retain said cycle oil substantially in the liquid phase, keeping said pressure below about 300 p.s.i.g. and said temperature below 700° F., passing the gaseous, liquid and solid products from the reaction zone to a separation zone, separately withdrawing gases including hydrogen and hydrogen sulfide, desulfurized liquid hydrocarbon and spent sulfur-containing catalyst from said separation zone and contacting the spent catalyst with hydrogen in a reactivation zone at about 600° to 1300° F., and less than 300 p.s.i.g. for ⅓ to 5 hours to reactivate the catalyst.

2. Method as defined in claim 1 in which the catalyst contains between 0.2 and 2.0 wt. percent platinum and has a particle size range of about 50 to 150 microns.

3. Method as defined in claim 1 in which the cycle oil contains about 20 to 50 vol. percent aromatics.

4. Method as defined in claim 1 in which the reactivated catalyst has less than about 1 atom of sulfur per 100 atoms of platinum.

5. In the catalytic cracking of a petroleum fraction wherein a cycle oil boiling in the range of about 450° to 900° F., and containing from 0.5 to 3.0 wt. percent sulfur is fractionated from the cracked products and recycled to the cracking zone, the improvement which comprises slurrying the cycle oil with an amount of a particulate platinum catalyst to provide at least 0.5 atom of platinum per atom of sulfur within the slurry, contacting the slurry for 15 to 30 minutes with about 500 to 1000 s.c.f. of hydrogen per barrel of cycle oil at about 300° to 700° F., and less than 300 p.s.i.g. in a reaction zone, maintaining the temperature and pressure in said reaction zone to keep the cycle oil substantially in the liquid phase, passing the entire product stream to a separation zone where the stream is separated into an overhead gas stream containing hydrogen and hydrogen sulfide, a desulfurized cycle oil stream and spent sulfur-containing catalyst, introducing said cycle oil stream within said cracking zone, reactivating the spent catalyst by contacting it with hydrogen at a temperature of 600° to 1300° F., and up to 300 p.s.i.g. for ⅓ to 5 hours until the sulfur content of the catalyst is less than about 1 atom of sulfur per atom of platinum, and recycling the reactivated catalyst to the reaction zone.

6. Process as defined in claim 5 in which the catalyst contains about 0.2 to 2 wt. percent platinum.

7. Process as defined in claim 5 in which the cycle oil contains about 20 to 50 vol. percent aromatic compounds.

8. Process as defined in claim 6 in which the catalyst has a particle size range of about 10 to 200 microns.

9. Process as defined in claim 6 in which the catalyst has a particle size range of about 50 to 150 microns.

References Cited in the file of this patent

UNITED STATES PATENTS

| | | |
|---|---|---|
| 1,908,286 | Dorrer | May 9, 1933 |
| 2,282,451 | Broooks | May 12, 1942 |
| 2,440,673 | Jones | May 4, 1948 |
| 2,441,297 | Stirton | May 11, 1948 |
| 2,542,970 | Jones | Feb. 27, 1951 |
| 2,671,754 | De Rosset et al. | Mar. 9, 1954 |
| 2,691,623 | Hartley | Oct. 12, 1954 |
| 2,723,943 | McAfee | Nov. 15, 1955 |

FOREIGN PATENTS

| | | |
|---|---|---|
| 653,320 | Great Britain | Jan. 5, 1949 |